United States Patent
Sartain et al.

(10) Patent No.: US 6,678,243 B2
(45) Date of Patent: *Jan. 13, 2004

(54) VARIABLE CODEC FRAME LENGTH

(75) Inventors: Daryl Sartain, Austin, TX (US); Terry Sculley, Austin, TX (US)

(73) Assignee: ESS Technology, Inc., Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,669

(22) Filed: May 11, 1998

(65) Prior Publication Data

US 2002/0085489 A1 Jul. 4, 2002

Related U.S. Application Data

(60) Provisional application No. 60/066,003, filed on Nov. 14, 1997.

(51) Int. Cl.[7] .................................................. H04J 1/16
(52) U.S. Cl. ........................ 370/229; 370/465; 370/470
(58) Field of Search .............................. 370/229, 465, 370/468, 470–472, 485–487; 348/419, 714–719; 710/52–59, 60

(56) References Cited

U.S. PATENT DOCUMENTS

| | | | | |
|---|---|---|---|---|
| 5,159,447 A | * | 10/1992 | Haskell et al. | 348/419 |
| 5,235,618 A | * | 8/1993 | Sakai et al. | 358/431 |
| 5,453,790 A | * | 9/1995 | Vermeuleu et al. | 348/410 |
| 5,544,140 A | | 8/1996 | Seagrave et al. | |
| 5,565,924 A | * | 10/1996 | Haskell et al. | 348/423 |
| 5,619,341 A | * | 4/1997 | Auyeung et al. | 348/419 |
| 5,835,032 A | * | 11/1998 | Yasuda | 341/61 |
| 5,848,097 A | | 12/1998 | Carney et al. | |
| 5,914,960 A | * | 6/1999 | Rauhala et al. | 370/468 |
| 5,917,917 A | | 6/1999 | Jenkins et al. | |
| 5,966,385 A | * | 10/1999 | Fujii et al. | 370/465 |
| 6,057,791 A | * | 5/2000 | Knapp | 341/122 |

* cited by examiner

*Primary Examiner*—Seema S. Rao
*Assistant Examiner*—Melanie Jagannathan
(74) *Attorney, Agent, or Firm*—Gray Cary Ware & Freidenrich LLP; Peter R. Leal

(57) ABSTRACT

The invention dynamically compensates for differences in data rates. In one embodiment, the status of an input buffer is monitored and used to change the number of oversamples within a frame. In another embodiment, a high frequency clock in the system is used to stall the codec for one clock. In both ways, distortion due to differences in data rates is reduced.

43 Claims, 7 Drawing Sheets

VARIABLE CODEC FRAME LENGTH

This application claims benefit of provisional application No. 60/066,033 filed Nov. 14, 1997.

TECHNICAL FIELD

This invention relates to compensating data rates, and more particularly to modifying asynchronous data rates to compensate for data rate differences in successive blocks of a circuit.

BACKGROUND

Data sent to a codec may be sourced at an asynchronous rate. Overflow or underflow of the data may result if the data rate in one portion of a circuit is different from the data rate in a following section.

For example, audio data sent via a streaming pipe over the internet may be played as it is downloaded, e.g., using the MP3 standard. Downloading starts, a buffer is accumulated, and then the data is decompressed and played while the remainder downloads. The rate at which the data may be received from the internet server is directly dependent on the type of modem connection and how variable that connection is over time. As time goes on, a poor connection may lead to, for example, loss of data packets. As packets are retransmitted, the host side buffer may be drained and the data may run out.

This possible problem is described in the context of a digital-to-analog converter ("DAC") system 10. A DAC system 10 includes a digital portion 19 and an analog portion 21. If the DAC is an oversampling delta-sigma type, the digital portion will typically include an interpolator 13. The interpolator 13 includes an interpolation filter 23 and a sample-and-hold circuit 25. The interpolation filter 23 increases the sample rate and removes or significantly attenuates energy at $f_s/2$ and above, where $f_s$ is the input sampling frequency. The output of the interpolation filter 23 is processed through the sample-and-hold circuit 25 to provide an over-sampled output.

The output of the sample-and-hold circuit 25 is sent to modulator 15 which converts the oversampled signal into a one-bit data stream. The modulator 15 may be a delta-sigma modulator which provides good low level performance and can act as a one-bit digital quantizer. The one-bit data stream is sent to a one-bit DAC 29. The signal from the one-bit DAC 29 is then fed to the analog portion 21.

The analog portion 21 includes at least a filter 17. The filter 17 may be an analog low pass filter such as a switched capacitor filter.

A typical rate at which data may stream through the DAC system 10 may be 48 kHz. If this data is then passed to a downstream circuit which operates at a different speed, such as a constrained pipe, the data will either back up (if the downstream circuit operates at a lower speed), or stall (if the downstream circuit operates at a higher speed). For example, data may be recorded at 48 kHz and subsequently stored. The data may then be streamed to a system through a constrained pipe at an average rate of 46 kHz. The output will periodically stall because the data rate through the constrained pipe cannot be increased.

The present invention addresses the above problems by dynamically compensating for differences in data rates. In one embodiment, the status of an input buffer is monitored and used to change the number of oversamples within a frame. In another embodiment, the input buffer is still monitored but a high frequency clock in the system is used to stall the codec for one clock. In both embodiments, distortion due to differences in data rates is reduced.

In one embodiment, the method includes steps of receiving samples of a signal at a sampling rate, oversampling the sampled signal to generate a prespecified number of oversamples per a frame, and deleting or repeating one or more of the oversamples per frame to remove the overflow or underflow condition.

In another embodiment, the method includes steps of receiving samples of a signal at a sampling rate and oversampling the sampled signal to generate one of a prespecified number of oversamples per a frame. The prespecified number is equal to a nominal number in the absence of an overflow or underflow condition, the prespecified number is greater than the nominal number in an underflow condition, and the prespecified number is less than the nominal number in an overflow condition.

In another embodiment, the method includes steps of receiving samples of a signal at a sampling rate, oversampling the sampled signal to generate a prespecified number of oversamples per a frame; and stalling the circuit for a number of cycles of the master clock to remove the overflow or underflow condition.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
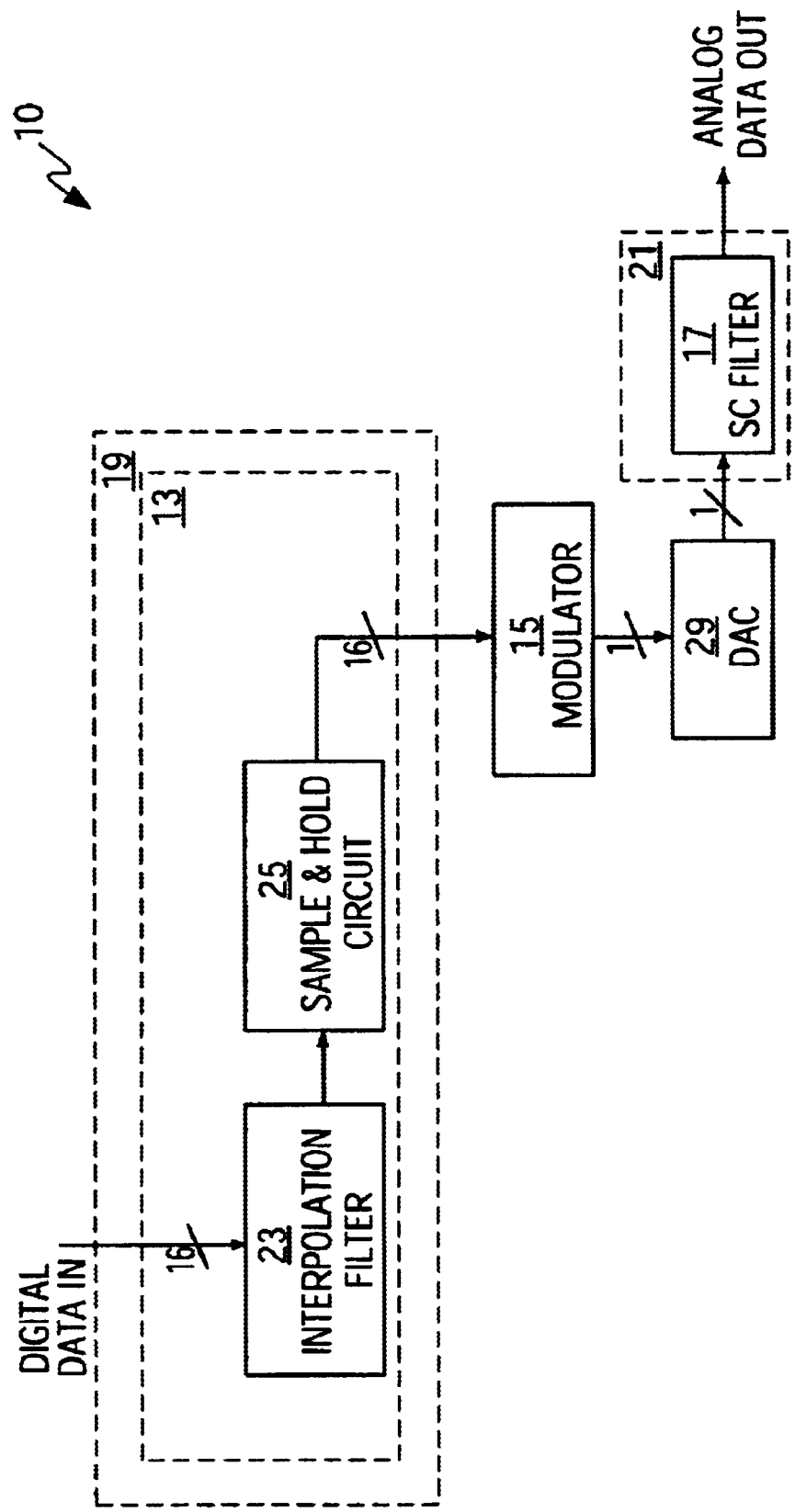
FIG. 1 is a schematic block diagram of a prior art DAC system.
Figure 2:
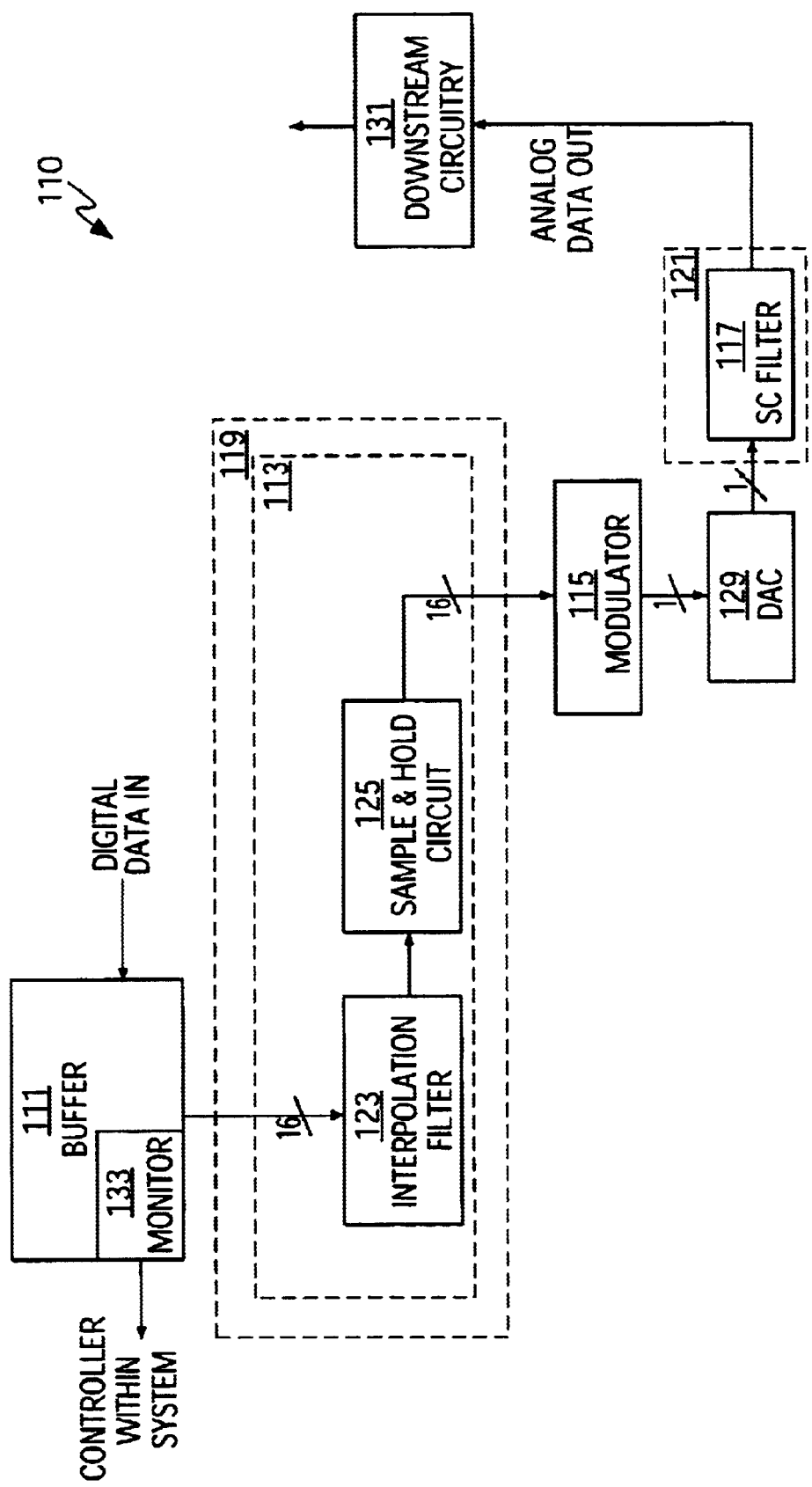
FIG. 2 is a schematic block diagram of a DAC system according to an embodiment of the present invention showing control of an input buffer.

The present invention solves many of the aforementioned problems by, in part, managing an input buffer to the codec. FIG. 2 shows such an input buffer in the context of a DAC system 110. In this DAC system 110, digital data flows to input buffer 111 which in turn directs the data to digital portion 119. The digital portion 119 includes an interpolator 113 having an interpolation filter 123 and a sample-and-hold circuit 125. The data flows to a modulator 115 and a one-bit DAC 129. At this point the analog data is coupled to the analog portion 121 which includes a filter 117. The analog data then may flow out of the DAC system 110 and into downstream circuitry 131.

The contents of the input buffer 111 may be tested in a monitor 133. The monitor may, for example, generate an underflow signal when the input buffer is empty or has an amount of data below some low threshold. It may also generate an overflow signal when the input buffer is full or has an amount of data above some high threshold. The results of the testing may be used to control various parts of the DAC system 110, or various parts of a circuit in which the DAC system 110 is located, in accordance with the principles of the invention as exemplified below. In particular, the status of the contents of the input buffer 111 as tested by monitor 133 can be used to make adjustments to other parts of the system in order to accommodate differing data rates. The way in which such adjustments are made are presented below as example embodiments of the invention.

The status of the input buffer 11 can indicate whether the downstream rate is greater than or less than the upstream rate. For example, if the input buffer 111 is full or nearly full, the downstream rate is likely to be less than the upstream rate. In other words, the data rate is too high to be accommodated by all downstream circuitry beginning at the digital portion 119. If the input buffer 111 is empty or nearly so, the downstream rate is likely greater than the upstream rate. In general, it is preferable to allow the input buffer 111 to operate without running empty.

Management of the input buffer 111 may include lengthening or shortening the sample frames to accommodate the different data rates. In a first embodiment, the codec frame length is varied. In this embodiment and others, the invention will be described in the context of a DAC system. However, one skilled in the art will recognize other systems in which the invention may be employed. For example, the invention may be employed in the context of an ADC or other devices in which both push-data and pull-data are present, such as a television tuner card in a computer. Of course, even the tolerance of a standard crystal oscillator in a system leads to differences in data rates.

The following definitions are used herein. When information is available to a system for immediate access on-demand, it is categorized as "pull data". This on-demand data may be from any type of storage medium that provides a feedback path for control. Examples of this type include HDD, CD, DVD, PC memory systems, and many others.

When information is transferred or broadcast without regard to its reception and no data flow control feedback, it is categorized as "push data". This data type will not slow, stop, or retransmit for the receiver; therefore, the receiver must keep pace. Examples of this type include television broadcast, radio broadcast, and internet multicast.

It is also noted that while 128 oversamples is used throughout this description, the actual number may vary with the application. A system with any number of oversamples may effectively use the method of the invention.

Figure 3:
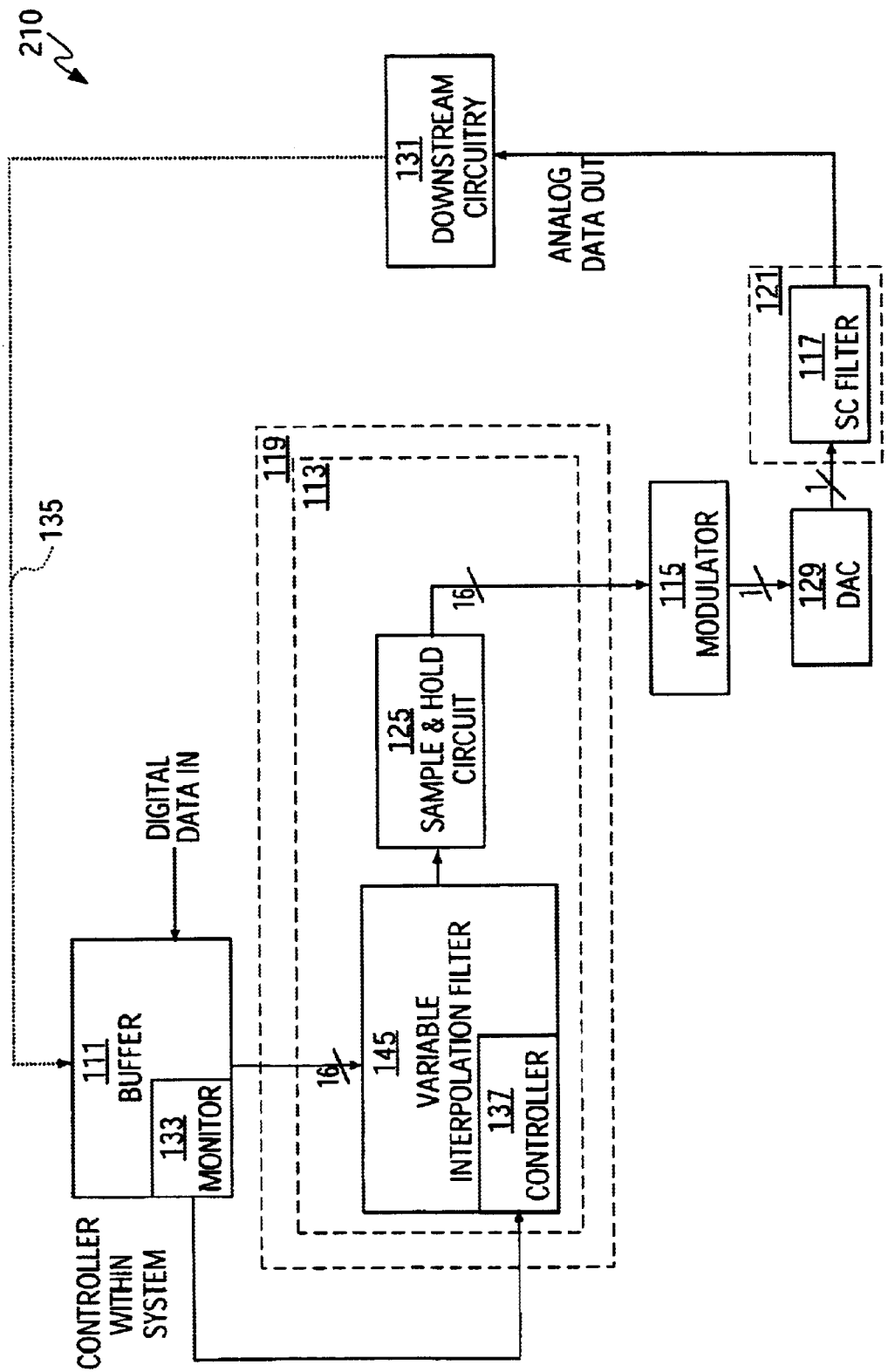
FIG. 3 is a schematic block diagram of a DAC system according to an embodiment of the present invention showing control of an input buffer via a variable interpolation filter.

One way of constructing this embodiment is shown by a DAC 210 in FIG. 3. This embodiment involves the use of a variable interpolation filter 145. As noted above, the interpolation filter is in part responsible for increasing or decreasing the sample rate. The variable interpolation filter 145 can generate extra or fewer oversamples for the given frame. In most cases, one extra or one fewer would be appropriate. By performing this in accordance with the oversampling rate, the distortion is reduced.

The digital portion 119 affects the input buffer 111 by way of data overflowing in the input buffer 111 or by the input buffer 111 running empty. In other words, the digital portion affects the input buffer 111 by overflowing or stalling. In a different embodiment, the digital portion 119 may actually provide a signal to input buffer 111 or to a monitor 133 within the input buffer 111. This signal would then provide an indication of the state of the data rate in the downstream circuitry 131 or even downstream of the downstream circuitry 131.

Preferably, the input buffer never completely overflows or stalls. The monitor detects when these conditions are close to occurring and signals the digital portion 119 to alter its number of oversamples per frame. The monitor, in this fashion, provides signals identifying a "near overflow" or a "near stall" condition.

Once a signal is received indicating that a near stall or overflow condition has occurred, the signal is sent to a controller 137 within the variable interpolation filter 145. This signal may be sent from the monitor 133 within buffer 111. Once received, the signal causes the variable interpolation filter 145 to alter the number of oversamples per frame. In other words, rather than having the interpolation filter provide a uniform number of additional oversamples per input sample, the variable interpolation filter 145 inserts or deletes oversamples as required to avoid the stall or overflow condition described above. For example, if variable interpolation filter 145 usually insert 128 oversamples per each input sample, a near overflow condition may cause the variable interpolation filter to insert only 127. Conversely, if variable interpolation filter 145 usually inserts 128 oversamples per each input sample, a near stall condition may cause the variable interpolation filter to insert 129. An appropriate number of coefficients is chosen for the extra or fewer oversamples. Appropriate control over the number of oversamples created is provided by the controller 137. In other words, in the example above, instead of 128 coefficients being chosen, 127 or 129 coefficients would be chosen.

Figure 4:
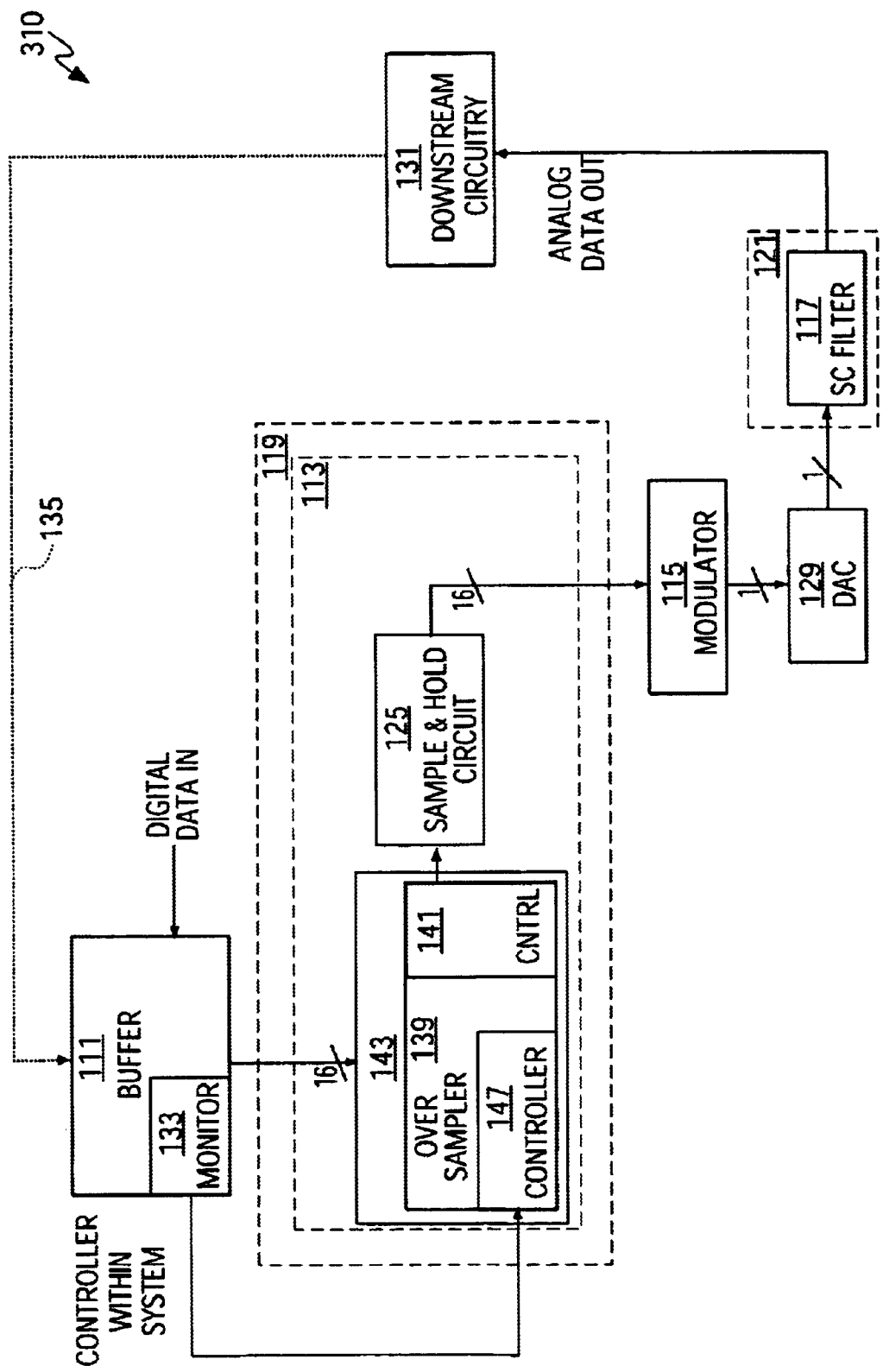
FIG. 4 is a schematic block diagram of a DAC system according to an embodiment of the present invention showing control of an input buffer via an interpolation filter and a frame controller.

In a different embodiment, rather than having a variable interpolation filter generate more or less oversamples per input sample, the interpolation filter may generate a fixed number of oversamples per input sample. However, once oversampling is completed, a particular oversample may be deleted or repeated in order to switch to a 127/129 oversample frame if required by a near overflow or near stall condition. This embodiment is shown in FIG. 4. In this figure, a DAC 310 has an interpolation filter 143 with two stages: an oversampling portion 139 and a frame controller 141. The oversampling portion 139 provides the requisite number of oversamples per sample, e.g., 128. The frame controller 141 deletes or repeats an oversample according to the stall or overflow condition. The determination of when the frame controller 141 is required to edit the number of oversamples may be made by the input buffer monitor 133 or by some other source, and is carried out via a controller 147. Of course, the controller 147 and the frame controller 141 may be within the same or different blocks of the circuit.

The location within the frame of the oversample that is deleted or inserted may be chosen in a random manner to avoid the generation of unwanted tonal components. Such a method is described below. If tonal component generation is not a factor, the location of the oversample chosen may be arbitrary. For example, the first oversample or the last oversample may always be the oversample chosen.

In both of these embodiments, any error introduced by the removal or addition of oversamples is spread over all (approximately) 128 oversamples. In other words, errors occur to oversampled values rather than to raw input samples so as to preserve data integrity.

Figure 5:
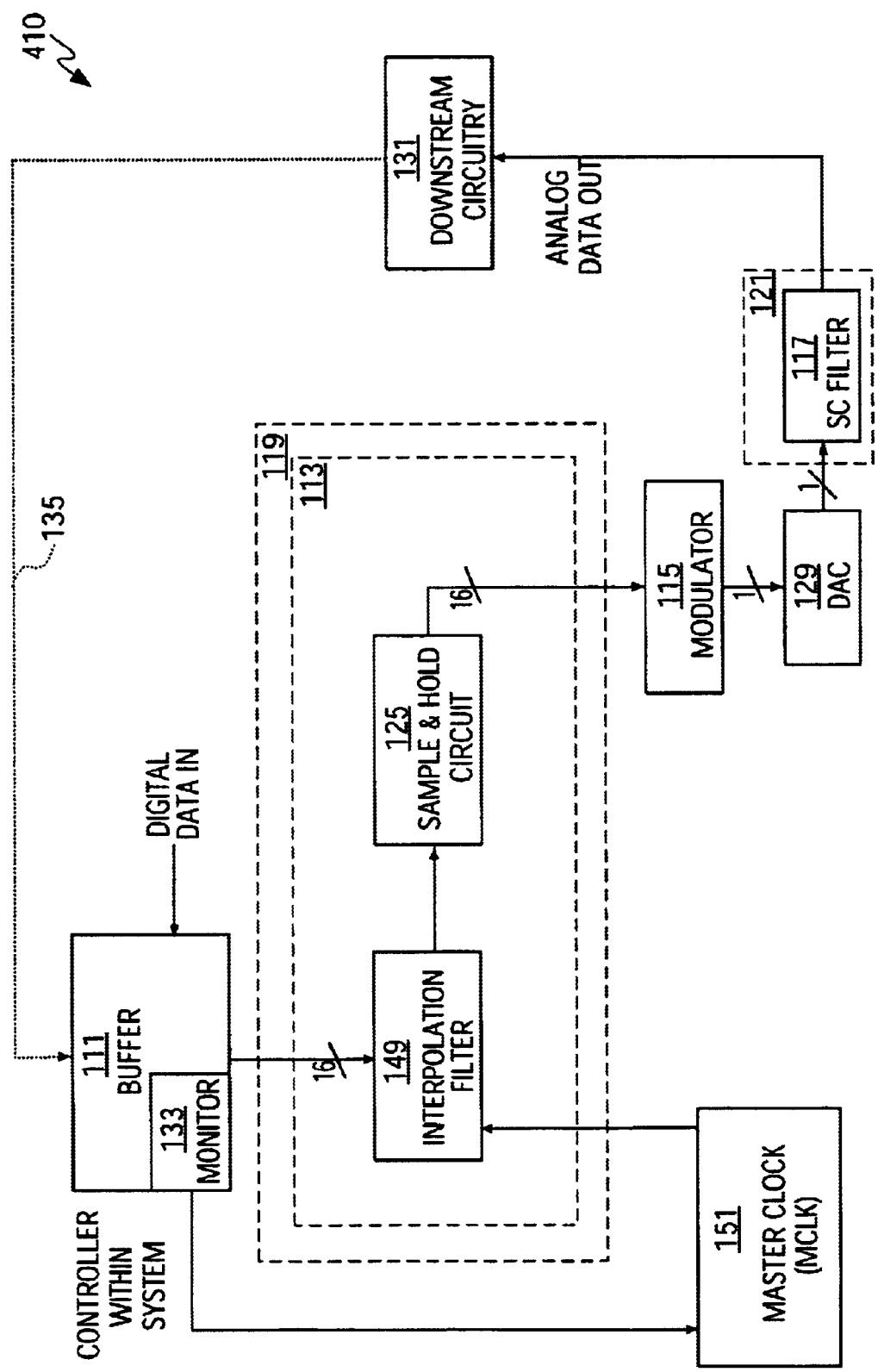
FIG. 5 is a schematic block diagram of a DAC system according to an embodiment of the present invention showing control of a stall condition by using a master clock to stall the codec for a clock cycle.

In yet another embodiment, as shown by FIG. 5, no extra or fewer oversamples are created, nor are a set number of oversamples subject to a repetition or deletion of any one oversample. In this embodiment, the codec is stalled for one or more clock cycles. This embodiment is applicable to those situations where the interpolation filter creates an additional oversample, rather than where the interpolation filter causes the deletion of an oversample or the creation of fewer than the nominal number of oversamples.

FIG. 5 shows a master clock 151 controlling the interpolation filter 149. The master clock 151 may, of course, also control various other aspects of the system. Moreover, the master clock 151 may be used to create other clocks whose rates are either the same or are based on the master clock 151. The presence and rates of these other clocks depend on the requirements of the system. In this embodiment, the clock with the highest rate, here denoted MCLK 151, may be used as the basis for the stall procedure.

The MCLK 151 may be caused to stall for one or more clock cycles or alternatively for one or more phases of the MCLK 151. In this way, the downstream circuitry 131 may be allowed time to process the overflow oversamples and thus remove the overflow condition. The resulting frames in the codec would be slipped.

This embodiment may produce less distortion than the sampling based embodiments above. For example, a typical master clock rate may be MCLK=24.576 MHZ. Using a half-clock stall leads to:

$$\frac{(2)(24.576 \text{ MHz})}{48 \text{ kHz}} = 1024 \to 20 \log 1024 = 60 \text{ dB}$$

In this example, the clock stall thus provides 60 DB less distortion than the sample-based solutions because the master clock has a much higher resolution than the sample rate. It should be noted in this embodiment that the bus interface would need to operate asynchronously such that the bus would not see the stall of the MCLK 151.

In these embodiments, the monitor 133 of input buffer 111 may be used to detect and correct overflows or underflows in several ways. For example, low and high thresholds may be set and used to trigger the change in the frame length as described above. The resulting change in data consumption rate causes the input buffer 111 to move back between the low and high thresholds and the oversamples per frame are reset to nominal. If the tested parameter is not reset (due, e.g., to a large mismatch in data rates) the frame length may be adjusted further to increase the rate of recovery.

In another modification, rather than have a preset number of oversamples per frame, monitor 133 may consider the number of oversamples per frame to be a variable which is usually at a steady-state value but which varies with overflows and underflows. In this method, termed herein the "loop offset mode", thresholds are still set at low and high points but the number of oversamples per frame no longer tends towards a fixed value. Rather, the number of oversamples per frame tends towards whatever value is required to reduce the overflow or underflow.

For example, if the tested parameter indicates an underflow (the low threshold is passed), the number of oversamples per frame may increase to 129 from 128. This causes the underflow to be eliminated. Rather than move back to 128, the number of oversamples per frame stays at 129 until the buffer falls below the low threshold again or above the high threshold. The loop offset mode may be especially useful when the sourcing rate is significantly different from the playback rate.

The error difference provided by adjusting the samples at 128× oversampling are two orders of magnitude greater than error concealment performed at the sample rate, reducing distortion effects by over 40 DB (e.g., 20 log 128=48 DB). Of course, the codec internal frame should be fully independent of the audio input frame.

Figure 6:
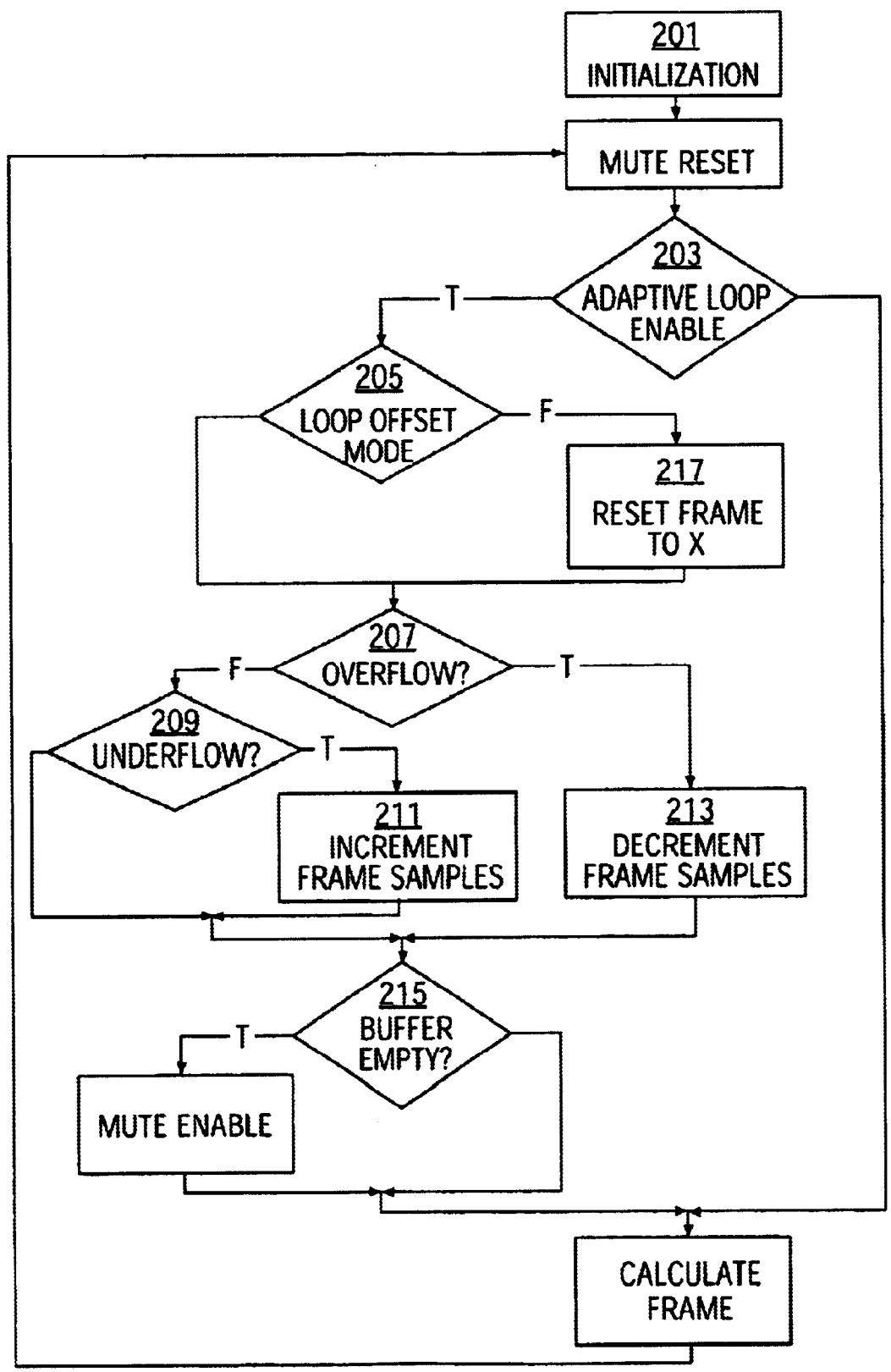
FIG. 6 is a flowchart for an adaptive control loop according to an embodiment of the present invention.

FIG. 6 shows a flowchart for an adaptive control loop used in the codec input buffer, and in particular an operation of an adaptive error concealment codec. Thresholds are established for both overflow and underflow conditions. The first step is subsystem initialization 201. A decision 203 is then made as to whether the adaptive circuit is enabled. This decision ensures that the codec has a mode that is compatible with industry codecs. If the adaptive circuit is enabled, then a determination is made as to whether the "loop offset mode" is enabled (step 205). As mentioned above, the loop offset mode is particularly suitable when rates vary significantly in different portions of a system because the frame size may continue to be modified in a rate-adaptive manner. If the loop offset mode is enabled, then the determination of overflow (step 207) or underflow occurs (step 209). For example, if the input buffer falls below the low threshold (underflow step 209), each consecutive frame in which the buffer is below the low threshold has a frame length that is increased (step 211), e.g., by one oversample value. Once the playback rate matches the source rate, the buffer status moves back above the low threshold and stabilizes at a frame size appropriate for the incoming data. If an overflow condition occurred, each consecutive frame in which the buffer is above the high threshold has a frame length that is decreased (step 213), e.g., by one oversample value. In both the case of an underflow and where the number of oversamples per frame is decreased, a test for an empty buffer (step 215) may occur. In both underflows and overflows, the frame size is adjusted to compensate and the final size of the frame is calculated (step 219) from the loop responses. The net effect is that the data is played at a rate that is different from its recorded rate; however, empty frames do not occur, nor do overflows.

If the loop offset mode is not enabled, then the frame length is reset, for each frame, to the preset value (e.g., 128 oversamples per frame) (step 217). For small drifts between the source data and the playback, this way may be preferred and allows for instantaneous correction with low distortion. It should be noted that this flowchart is only representative of one of the several methods available.

It should also be noted that when oversample insertion or removal occurs at a periodic rate, there is a tonal component generated at the rate of insertion or removal. If the rate of insertion or removal is randomized, the tonal energy will be distributed over a wide range and the overall tonal component will be small enough to be unnoticeable.

In order to achieve a random insertion or removal rate, the timing in which the interpolator may be caused to insert or remove an oversample may be adjusted. In particular, when the interpolator receives a request for an oversample skip or repeat, the interpolator may simply insert or remove the oversample accordingly; however, this may lead to the tonal generation above. Instead, the interpolator may choose to wait to insert or remove the oversample until a prespecified time. The appropriate prespecified time to insert or remove an oversample may be when the frame's oversamples have an extreme value (i.e., an approximately zero slope). At these points, addition or removal of oversamples does not result in a significant change in the frequency components. A certain time period is added but little distortion is added.

Figure 7:
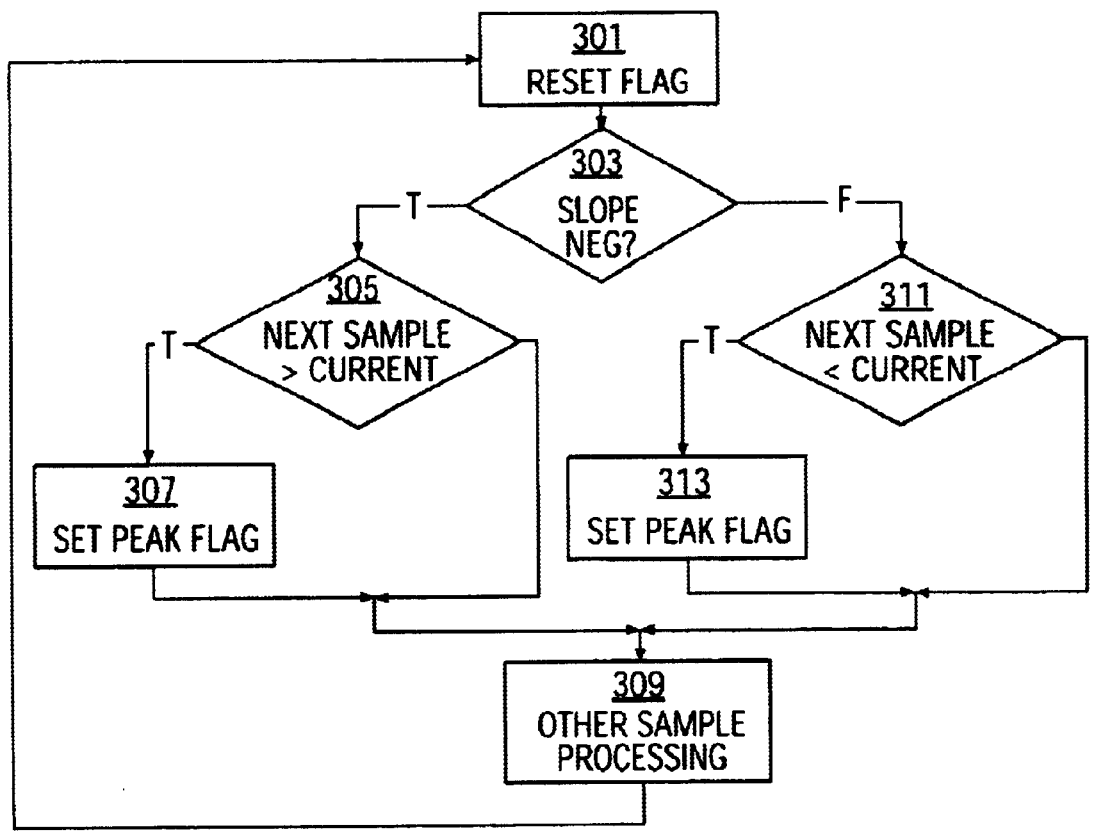
FIG. 7 shows a flowchart for the detection of an appropriate peak frame for use in inserting or removing oversamples at random rates.

One method of determining the extreme value is shown in FIG. 7. FIG. 7 shows an extremal detection flowchart. Initially, an extremal flag is reset (step 301). The first test may be for a negative slope of the current frame (step 303). If the slope is negative, then the following frame slope is tested (step 305). If this slope is not negative, then the extremal flag is set (step 307) and the insertion or removal may proceed. If this slope is negative, other sample processing may occur (step 309) and the slope detect procedure is begun again. If the current frame slope is not negative, then the following frame slope is tested (step 311). If this slope is negative then the extremal flag is set (step 313) and the insertion or removal may proceed. If this slope is not negative, other sample processing may occur (step 309) and the slope detect procedure is begun again. Again it is noted that this flowchart is only representative of one of the several methods available.

It should be noted that if no extremal is available after waiting a prespecified period of time, the interpolator may be forced to insert or remove the oversample despite the lack of an extremal frame (e.g., a 20 Hz input with extremes every 25 ms).

It is noted that the source data frame sync and the internal codec frame sync do not need to sync-up because the incoming stream is destined for the analog domain. Thus, in the context of the system which generated the incoming stream, there is no longer a frame of discrete reference. The data is in continuous time, allowing full decoupling of the data bus frame sync from the internal codec frame sync.

EXAMPLE OF ERROR ACCUMULATION

The accumulated error, when an extra audio oversample is created (to account for data rate disparities in a system), may be estimated as follows. The master clock for audio may be operated at, e.g., 48 kHz×128×2=12.288 MHZ. The oversampling rate is 48 kHz times the number of oversamples per frame (128)=6.144 MHZ. With the oversample rate of 128, if the frame were lengthened to 129, the number of audio samples per second would be $$\frac{12.288 \text{ MHz}}{2 \times 129} = 47,628$$

For typical oscillators, at a 50 PPM/clock accuracy, a 100 PPM error could result from the two clocks. At 48 kHz, this results in 4.8 samples per second drift between subsystems. At 1/10,000 of the distribution of 128 oversamples, this leads to 10,000/128 or 78. In other words, one extra or fewer oversamples would be generated each 78 audio samples.

A number of embodiments of the present invention have been described. Nevertheless, it will be understood that various modifications may be made without departing from the spirit and scope of the invention. For example, the invention may be utilized in a number of other devices besides DACs. Moreover, the invention is intended to encompass any sample rates, oversample rates, master clock rates, DAC bit resolution, etc. The values used here are only for illustrative purposes and should not be considered limiting. Accordingly, other embodiments are within the scope of the following claims.

What is claimed is:

1. A method of dynamically compensating for an overflow condition in a circuit, comprising:
   sampling a signal at a sampling rate;
   storing the sampled data in an input buffer;
   detecting an internal status of the input buffer to produce a buffer detection signal to indicate whether the input buffer is in an overflow or underflow condition;
   oversampling each data point of the sampled data in time to generate a frame of a prespecified number of oversamples in time to represent said data point;
   changing an amount of oversampling per frame, when the frame's oversamples have an extreme value, to at least partially compensate for the overflow or underflow condition in response to the buffer detention signal.

2. The method of claim 1, wherein the internal status includes an amount of memory available in the input buffer.

3. The method of claim 1, further comprising the step of detecting the overflow condition by testing the status of a data buffer in a portion of a downstream circuit.

4. The method of claim 1, further comprising the step of generating a number of coefficients equal to the prespecified number.

5. An apparatus for dynamically compensating for an overflow condition in a circuit, comprising:
   an interpolation filter to generate a fixed number of oversamples in time for an input sample;
   a frame controller coupled to the interpolation filter to delete, when the frame's oversamples have an extreme value, at least one of the number of oversamples generated in response to a frame control signal;
   a buffer disposed to receive the input sample prior to the generation of oversamples and to send the input sample to said interpolation filter; and
   a monitor coupled to test an internal parameter of the buffer and to provide the frame controller with the frame control signal.

6. A method of dynamically compensating for an overflow condition in a circuit, comprising:
   sampling a signal at a sampling rate;
   storing the sampled data in an input buffer;
   detecting an internal status of the input buffer to produce;
   a buffer detection signal to indicate whether the input;
   buffer is in an overflow condition;
   oversampling the sampled signal from the input buffer in time to generate one of a prespecified number of oversamples per frame for each sampled input data in the sampled signal;
   keeping the prespecified number of oversamples per frame equal to a nominal number in the absence of an overflow condition; and
   adjusting, when the frame's oversamples have an extreme value, the prespecified number to be less than the nominal number when the overflow condition occurs.

7. The method of claim 6, wherein the prespecified number is equal to the nominal number minus one oversample when the overflow condition occurs.

8. The method of claim 6, wherein the internal parameter includes an amount of memory available in the input buffer.

9. The method of claim 6, further comprising the step of detecting the overflow condition by testing the status of a data buffer in a portion of a downstream circuit.

10. The method of claim 6, further comprising the step of generating a number of coefficients equal to the prespecified number.

11. A method of dynamically compensating for an underflow condition in a circuit having a master clock comprising:
sampling a signal at a sampling rate;
storing the sampled data in an input buffer;
detecting an internal status of the input buffer to produce a buffer detection signal to indicate whether the input buffer is in an underflow condition;
oversampling the sampled signal from the input buffer in time to generate a prespecified number of oversamples per frame for each sampled input data in the sampled signal; and
stalling the circuit, when the frame's oversamples have an extreme value, for a number of cycles of the master clock to control a flow rate of the oversamples to remove the underflow condition in response to the buffer detection signal.

12. The method of claim 12, wherein the internal parameter includes an amount of memory available in the input buffer.

13. The method of claim 11, further comprising the step of detecting the underflow condition by testing the status of a data buffer in a portion of a downstream circuit.

14. An apparatus for dynamically compensating for an underflow condition in a circuit, comprising:
an interpolation filter to generate a number of oversamples in time for an input sample;
a master clock coupled to the interpolation filter to control the operation of the interpolation filter;
a buffer to hold the input sample prior to the generation of oversamples; and
a monitor to test the buffer for an underflow condition, the monitor coupled to the master clock to stall the master clock upon the occurrence of an underflow condition to at least partially compensate for the underflow condition when the frame's oversamples have an extreme value.

15. A method of dynamically compensating for an underflow condition in a circuit, comprising:
sampling a signal at a sampling rate;
storing the sampled data in an input buffer;
detecting an internal status of the input buffer to produce a buffer detection signal to indicate whether the input buffer is in an underflow condition;
oversampling the sampled signal from the input buffer in time to generate a prespecified number of oversamples per frame for each sampled input data in the sampled signal;
changing an amount of oversampling per frame, when the frame's oversamples have an extreme value, to at least partially compensate for the underflow condition in response to the buffer detection signal.

16. The method of claim 15, wherein the internal parameter includes an amount of memory available in the input buffer.

17. The method of claim 15, further comprising the step of detecting the underflow condition by testing the status of a data buffer in a portion of a downstream circuit.

18. The method of claim 15, further comprising the step of generating a number of coefficients equal to the prespecified number.

19. An apparatus for dynamically compensating for an underflow condition in a circuit, comprising:
an interpolation filter to generate a frame of a fixed number of oversamples in time for an input sample;
a frame controller coupled to the interpolation filter to repeat at least one of the number of oversamples generated when the frame's oversamples have an extreme value;
a buffer for holding the input sample prior to the generation of oversamples; and
a monitor to test the buffer, the monitor coupled to the frame controller to provide the frame controller with an underflow condition in a circuit.

20. A method of dynamically compensating for an underflow condition in a circuit, comprising:
sampling a signal at a sampling rate;
storing the sampled data in an input buffer;
detecting an internal status of the input buffer to produce a buffer detection signal to indicate whether the input buffer is in an underflow condition;
oversampling the sampled signal in time to generate a prespecified number of oversamples per frame;
keeping the prespecified number equal to a nominal number when the buffer detection signal indicates the absence of an underflow condition; and
when the frame's oversamples have an extreme value, adjusting the prespecified number to be greater than the nominal number when the buffer detection signal indicates an underflow condition.

21. The method of claim 20, wherein the prespecified number is equal to the nominal number plus one oversample in an underflow condition.

22. The method of claim 20, wherein the internal parameter includes an amount of memory available in the input buffer.

23. The method of claim 20, further comprising the step of detecting the underflow condition by testing the status of a data buffer in a portion of a downstream circuit.

24. The method of claim 20, further comprising the step of generating a number of coefficients equal to the prespecified number.

25. The method as in claim 1, further comprising:
sampling the resultant samples to produce two or more new samples from each resultant sample;
performing a sigma-delta modulation on the new samples;
converting the modulated samples into an analog signal; and
filtering the analog signal to produce an analog output.

26. A method of dynamically compensating for an underflow or near-underflow condition, or for an overflow or near-overflow condition, in a digital-to-analog conversion circuit, comprising:
sampling a digital input signal at a sampling frequency rate;
storing the input samples in an input data buffer;
providing said input samples in said input data buffer as input to an interpolator circuit;
oversampling the sampled signal in said interpolator circuit to generate a specified number of oversamples per frame;
testing the status of said input data buffer to detect (a) an underflow or near-underflow or (b) an overflow or near-overflow condition;
changing the specified number of oversamples per a frame to at least partially compensate, respectively, for an underflow or near-underflow condition or for an overflow or near-overflow condition;
determining the specified number of oversamples per a frame through processing (i) the results of the input data buffer status, (ii) the presence or absence of an underflow or near-underflow condition or of an overflow or near-overflow condition, and (iii) the previously determined specified number of oversamples that is in use;

providing the oversamples generated by said interpolator as inputs to a sample-and-hold circuit, which generates an integer number of output samples per every input sample, said integer number being larger than one;

providing said output samples from said sample-and-hold circuit as input to a digital delta-sigma modulator, which generates one output sample per every input sample, said output sample having digital resolution less than the digital resolution of said input sample;

providing said output samples of said digital delta-sigma modulator as input to a digital-to-analog converter circuit, which generates an analog output signal;

providing said analog output signal of said digital-to-analog converter as input to an analog filter circuit, which generates a final analog output signal.

27. The method of claim 26, wherein said output samples generated by said digital delta-sigma modulator have one-bit digital resolution.

28. The method of claim 26, wherein the step of generating said specified number of oversamples per frame by said interpolator circuit includes the step of said interpolator first generating a prespecified number of oversamples per frame, said prespecified number always being larger or equal to said specified number;

said interpolator next deleting none or some subset of the prespecified number of oversamples generated, such that only the specified number of oversamples per a frame remain, which are then provided as output samples from said interpolator circuit;

the number of oversamples that are deleted being calculated as the prespecified number minus the specified number, this result always ranging between zero and some positive number.

29. The method of claim 28, including the step of selecting which of the prespecified number of oversamples per a frame should be deleted by a randomized or pseudo-randomized process, in order to avoid introduction of any tonal components in said interpolator output signal.

30. The method of claim 28, further comprising:

selecting which of the prespecified number of oversamples per a frame should be deleted is done by choosing samples that occur at or near an extremal of the signal, such that the signal made up of the samples before deletion has approximately zero slope.

31. A method of dynamically compensating for an underflow or near-underflow condition, or for an overflow or near-overflow condition, in a digital-to-analog conversion circuit, comprising:

sampling a digital input signal at a sampling rate to obtain input samples;

storing the input samples in an input data buffer;

providing said input samples in said input data buffer as input to an interpolator circuit;

clocking said interpolator circuit and all following circuitry by a master clock or other clocks derived from said master clock;

said interpolator circuit oversampling the sampled signal to generate a specified number of oversamples per frame;

selecting (i) an underflow or near-underflow condition or (ii) an overflow or near-overflow condition by testing the status of said input data buffer;

providing to the interpolator circuit and all following circuitry a calculated number of half-clocks per a frame to stall the master clock in order to at least partially compensate for said underflow or near-underflow condition or for said overflow or near-overflow condition;

determining said calculated number of half-clock stalls per a frame through processing the results of the input data buffer status and presence or absence of (i) an underflow or near-underflow condition or an overflow or near-overflow condition and (ii) the previously calculated number of half-clocks that is in use;

providing the oversamples generated by said interpolator as inputs to a sample-and-hold circuit, which generates an integer number of output samples per every input sample, said integer number being larger than one;

providing said output samples from said sample-and-hold circuit as input to a digital delta-sigma modulator, which generates one output sample per every input sample, said output sample having digital resolution less than the digital resolution of said input sample;

providing said output samples of said digital delta-sigma modulator as input to a digital-to-analog converter circuit, which generates an analog output signal;

providing said analog output signal of said digital-to-analog converter as input to an analog filter circuit, which generates a final analog output signal.

32. The method of claim 31, further comprising:

selecting where temporally within a frame said calculated number of half-clock stalls occur in a randomized or pseudo-randomized manner, in order to avoid introduction of any tonal components in said interpolator output signal.

33. The method of claim 31, further comprising:

selecting where temporally within a frame these said calculated number of half-clock stalls occur by choosing locations that occur at or near an extremal of the signal, such that the signal made up of the samples before the stalls have approximately zero slope.

34. The method of claim 26, in which said digital delta-sigma modulator is a low-pass digital delta-sigma modulator.

35. The method of claim 26, in which said analog filter circuit is a low-pass analog filter circuit.

36. The method of claim 26, in which said analog filter circuit is a switched-capacitor analog filter circuit.

37. The method of claim 26, in which said digital delta-sigma modulator is a band-pass digital delta-sigma modulator.

38. The method of claim 26, in which said analog filter circuit is a band-pass analog filter circuit.

39. The method of claim 31, in which said digital delta-sigma modulator is a low-pass digital delta-sigma modulator.

40. The method of claim 31, in which said analog filter circuit is a low-pass analog filter circuit.

41. The method of claim 31, in which said analog filter circuit is a switched-capacitor analog filter circuit.

42. The method of claim 31, in which said digital delta-sigma modulator is a band-pass digital delta-sigma modulator.

43. The method of claim 31, in which said analog filter circuit is a band-pass analog filter circuit.

* * * * *